July 16, 1946.   R. E. CROWLEY   2,403,911
METHOD OF AND MEANS FOR RECORDING
Filed Sept. 21, 1942   3 Sheets-Sheet 1

INVENTOR.
Robert E Crowley,
BY George H. Simmons
attys

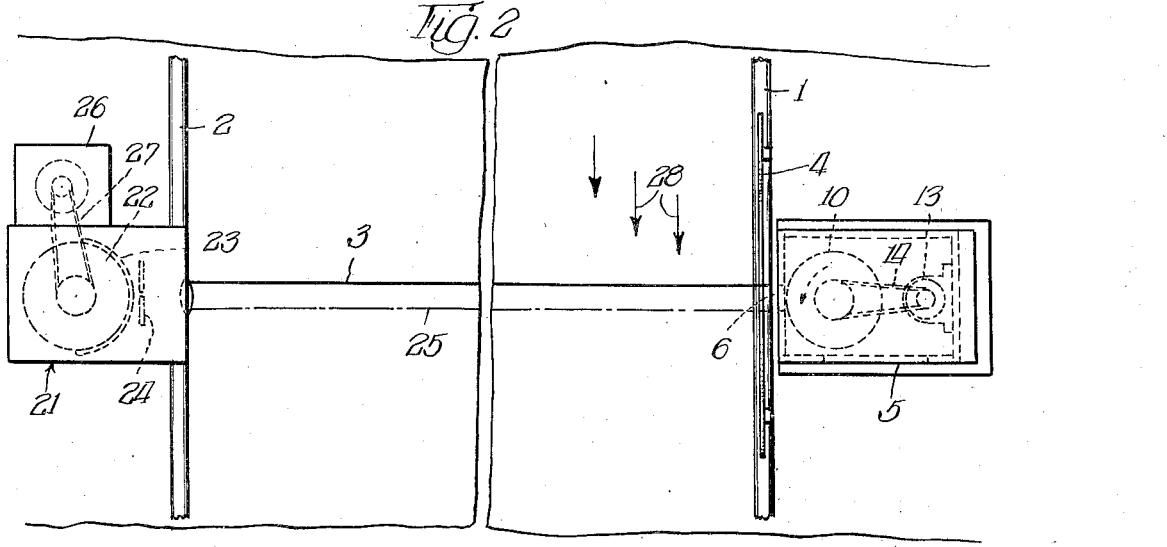
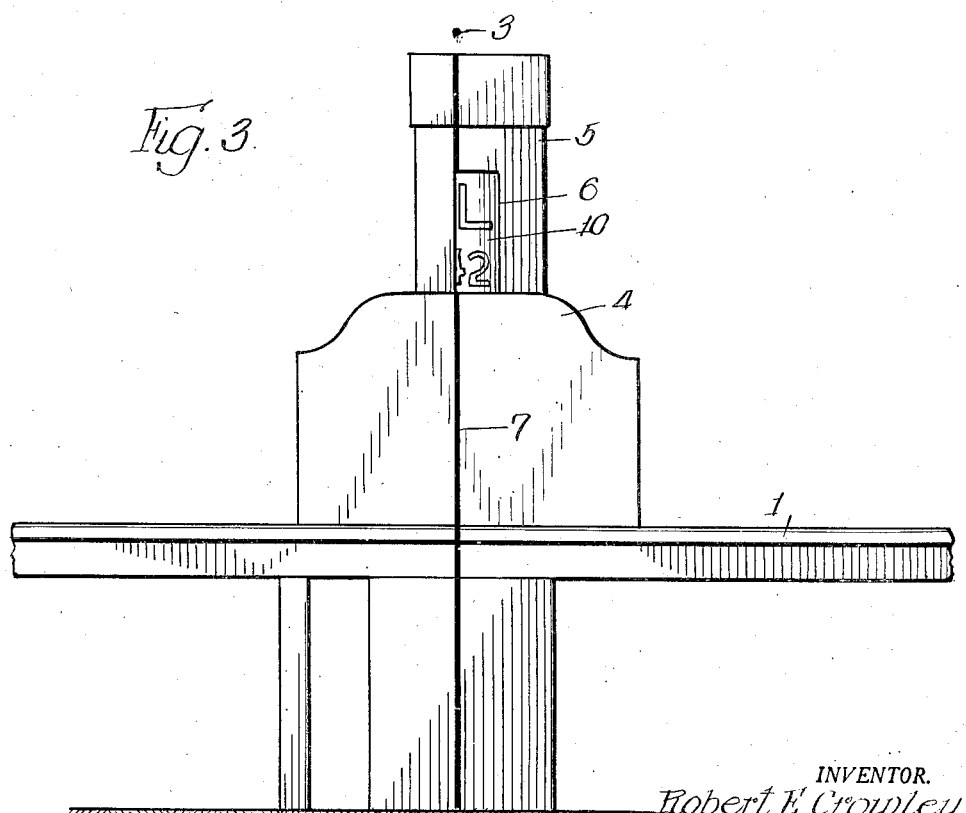

July 16, 1946.   R. E. CROWLEY   2,403,911
METHOD OF AND MEANS FOR RECORDING
Filed Sept. 21, 1942   3 Sheets-Sheet 3

INVENTOR.
Robert E. Crowley,
BY George H. Simmons
Attys

Patented July 16, 1946

2,403,911

UNITED STATES PATENT OFFICE 2,403,911

METHOD OF AND MEANS FOR RECORDING

Robert E. Crowley, Baltimore, Md.

Application September 21, 1942, Serial No. 459,078

6 Claims. (Cl. 95—11)

This invention relates to recording the passing of moving objects over a given line or through a vertical plane through a given line and has for its principal object to provide a new and improved method of and means for making such a record.

It is the main object of the invention to provide a method of and means for recording objects as they move over a given line and for simultaneously recording a timing indicia as it moves over said line so that the time elapsing between the movement of the first and a succeeding one of said objects over said line can be accurately determined.

Another object of the invention is to provide method of and means for recording objects passing over a line which avoids the possibility of error, by making a record only of the objects as they actually cross the line.

Still another object of the invention is to provide a method of recording which can be put into practice by the use of simple inexpensive equipment capable of being installed at low cost and operated over a long period of time with a minimum of maintenance.

Further objects of the invention not specifically mentioned here will be apparent from the detailed description and claims which follow, reference being had to the accompanying drawings in which a preferred embodiment of the invention is shown by way of example and in which:

Figure 2 is a plan view diagrammatically illustrating the apparatus employed in carrying out the method of the present invention;

Figure 3 is an elevational view of the backboard showing the slot with the spinner visible therethrough;

Figure 1:
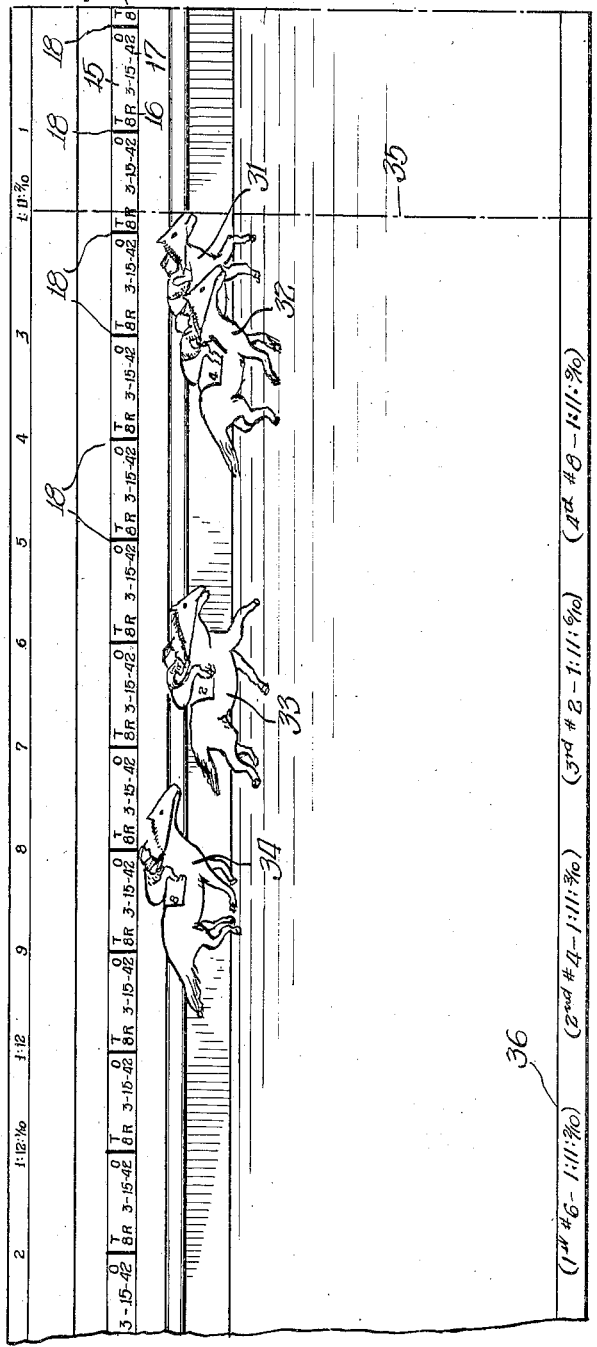
Figure 1 is a reproduction of a photo-chart made in accordance with the teachings of the invention.

The present invention relates to recording the passing of moving objects over a given line or through a vertical plane through that line and is particularly concerned with making a record from which the time elapsing between the passage of the first and a succeeding one of these objects can be quickly, easily, and accurately determined. One of the uses to which the method of the invention can be put is shown by way of example in the drawings, this embodiment showing the invention applied to recording the finish of a race in the example showing a horse race.

Race tracks are always provided with fences confining the inner and outer boundaries of the track and at the finish line a wire is stretched taut above the track. Judges and timers are located at one side of the track and above this wire and sight down past the wire to pick the order in which the contestants cross the finish line by passing under the wire. The timers take the time of the first place winner but heretofore have made no effort to get the time on the other contestants in the race. Tracks are also provided with photographic equipment, usually in the form of a motion picture machine, which is operated to photographically record the finish of every race and, in case two or more contestants run so close together that the judges cannot accurately determine which of these two actually reached the finish line first, results are delayed until the photographic record of the finish can be developed and printed.

The present invention in its adaptation to racing relates particularly to the photographing of the finish of the race.

Instead of using a motion picture camera which records the finish at the finish line by successive exposures of small pictures or frames as they are called, the present invention employs a moving film. The camera is set adjacent the finish line and the field of exposure of the camera limited by an optical system to a narrow band extending across the track and bounded upon one side by the finish wire. This field of exposure lies on the side of the finish wire opposite the contestants as they approach the finish wire, so that the camera does not record any contestant until that contestant is actually crossing the line.

In order to permit the making of such a record as to enable accurate determination of the time elapsing between the crossing of the finish line by the first and succeeding ones of the contestants, the present invention provides a so-called spinner located above the rail on the side of the track opposite the camera. This spinner is mounted in a suitable backboard and this backboard is equipped with a slot, one edge of which is accurately aligned with the finish wire and the slot is thus disposed in the field of the camera. The spinner, in the embodiment shown in the drawings, consists of a cylindrical drum mounted for rotation around a vertical axis and is visible to the camera only through this slot. The spinner is driven at a constant speed in such a direction that the exposed part of its periphery, visible through the slot, is moving in the same direction and at approximately the same speed as the contestants are moving when crossing the finish line. Located on the spinner are timing indicia and such other identifying data as may be desirable.

With this arrangement, there is recorded on the film or other photographically sensitive element in the camera the events happening in the limited field of the camera. As each contestant enters the field, its image is recorded as it crosses the same and simultaneously the images of the indicia on the spinner are recorded as a ribbon which on the film is located above the images of the contestants. With the record thus formed and a knowledge of the time elapsing from the start of the race to the crossing of the finish line by the winner, it is a simple matter to determine the time required for each of the contestants to traverse the race course.

Referring now to the drawings in more detail, particularly Figure 2 wherein it will be seen that the race track is bounded by an inner rail 1 and an outer rail 2 and that the finish wire 3 is extended across the track above these rails. Located on the rail 1 is a backboard 4 and a spinner housing 5 which contains a slot 6. Painted upon the backboard and housing is a distinctive line 7 which is vertical and in line with the finish wire 3 and serves to form a background for the finish wire as viewed by the judges and camera.

Figure 4:
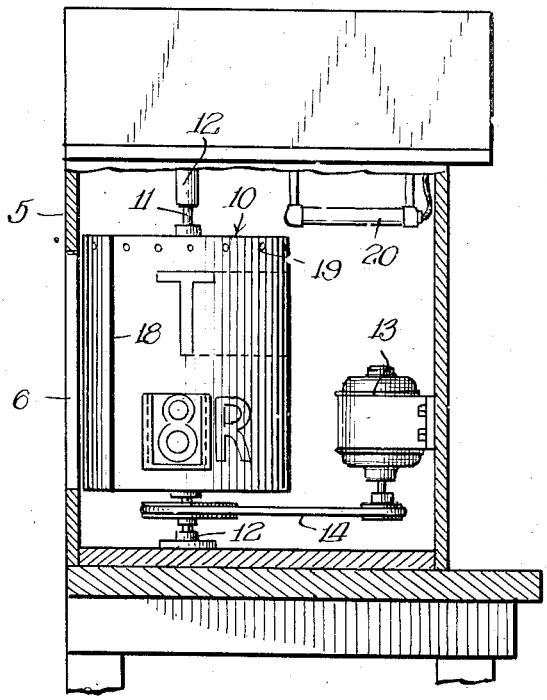
Figure 4 is a cross-sectional elevational view showing the details of construction of the spinner.

The slot 6, which is a rectangular slot, is located with one of its edges in this line 7 and, therefore, in alignment with the finish wire as viewed by the camera. It will be seen in Figures 2 and 4 the spinner housing 5 is a box-like structure within which is mounted a cylindrical drum 10 that is supported upon a vertical shaft 11, which shaft is carried in suitable bearings 12. A source of power, such as a motor 13, is connected to the shaft and drum by a suitable driving connection such as the pulleys and belt 14 so that the drum may be rotated around its vertical axis.

Figure 5:
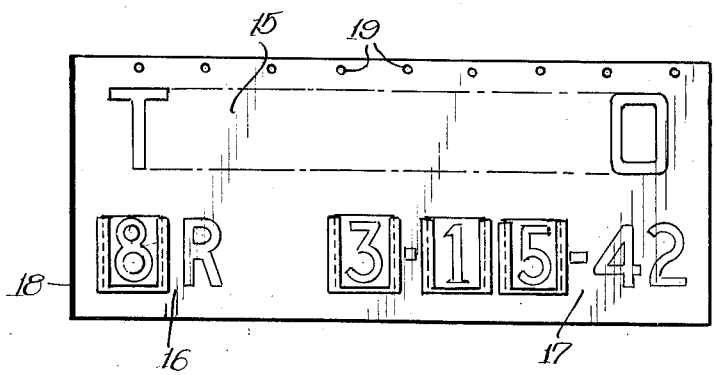
Figure 5 is a plan view of a typical spinner chart.

Carried upon the cylindrical face of the drum are various indicia best seen in Figure 5. In the example shown, the name of the track is located at the top of the drum as indicated at 15, and below this is an indication of the race number 16 consisting of a number and the letter R. Preferably the numbers are on separate units capable of being slipped into a suitable retainer as indicated so that the number of the race may be readily changed. To the right and in line with the race number is a date 17 the numerals indicating the month and day, being arranged so that they also may be readily changed. Also indicated upon the face of the drum is a timing marker 18 consisting of a line extending from top to bottom of the drum. Located at the top of the drum and above the upper limit of the slot 6 are a plurality of dots 19 forming with the neon lamp 20 a stroboscope through which the speed of rotation of the drum may be checked in the usual manner.

Located upon the opposite end of the finish wire 3 and above the rail 2 is a camera diagrammatically illustrated at 21 in Figure 2. The particular type of camera employed is not of the essence of the present invention, there being available on the market several devices suited for use in connection with this invention. Preferably the camera contains a drum or cylinder 22 around the edge of which is mounted a light sensitive film 23. Suitable masking means in the optical system, diagrammatically illustrated at 24, are provided to limit the field of the camera to a small band bounded by the finish wire 3 on one side and on the other side by a parallel line 25 spaced from the finish wire a distance substantially equal to the width of the slot 6. A suitable motor or other source of power 26 is employed to rotate the drum 22 through suitable means 27 so that the film 23 is moved at a uniform rate of speed past the aperture in masking means 24 to record on the film images of objects in the field of the camera.

The motor through which the drum 10 is driven is arranged to drive the drum in the direction indicated by the arrow Figure 2, so that the part of the drum exposed through the slot 6 is traveling in the same direction as the contestants indicated by the arrows 28 will be traveling in crossing the finish line 3. Preferably, the drum is of such diameter that at the speed of rotation at which it is driven the peripheral speed of the portion of the drum visible through the slot will be approximately the same as the speed of travel of the contestants in crossing the line and the motor 26 is arranged to drive the film 23 at a slower but proportional speed.

In the embodiment shown in the drawings, the drum 10 is driven at 600 R. P. M. which is ten revolutions per second and the timing indicia 18 therefore passes across the slot 6 once every $\frac{1}{10}$ of a second.

It will be seen in Figure 1 the record recorded upon the film embraces the track from side to side and consists of a band 30 extending from end to end of the film and containing the track name 15, race number 16 and date 17 a plurality of times separated by vertical lines which are the images of the timing indicia 18. The distance between adjacent lines 18 denotes the lapse of $\frac{1}{10}$ of one second of time. Also contained upon the film is an image of the contestants, which image is taken as they pass through the narrow field of the camera. The images of the first contestant 31, second contestant 32, third contestant 33, and fourth contestant 34 are shown in Figure 1, it being understood that there will be as many such images as there are contestants in the race.

After the film has been developed, it may be printed and preferably in printing a working line 35 is printed in to designate the finish line. Also, the official time of the race is preferably entered on the film as indicated at 36.

In the example shown in Figure 1, the winner 31 ran the race in an elapsed time of 1 minute $11\frac{2}{10}$ seconds. By measuring the distance from the nose of the second place contestant 32 to the construction line 35, the amount of time that must be added to the first place winner's time to determine the time of the second place winner can be easily determined. In the example shown, less than $\frac{1}{10}$ of a second must be added so that the time of the second winner 32 would be 1 minute $11^{26}/_{100}$ seconds. Figure 1 also shows that $\frac{3}{10}$ of a second elapsed between the crossing of the finish line by contestant 31 and the third place contestant 33, and that the actual time required by contestant 33 was 1 minute $11^{58}/_{100}$ seconds. The actual time required by contestant 34 and the other contestants in the race can be similarly determined.

Since the stop watches employed in timing races of this kind are not accurate beyond tenths of a second, the official time recorded, as indicated at 36, at the bottom of the film, is recorded only to the nearest tenth of a second. The film thus prepared can be enlarged and printed and prints given to the judges, handicappers, etc. and also displayed for public view if desired.

It must be remembered that the photo-chart shown in Figure 1 is not an instantaneous picture of the contestants taken at the instant that the winner crosses the finish line, but rather it is a record of each contestant taken as that contestant crosses the finish line and passes through the narrow band-like field of exposure of the camera.

The order of finish recorded on the photo-chart is absolutely accurate since the camera records only objects in its limited field of exposure. No image of a contestant can be taken until that contestant actually crosses the finish line.

In setting up the apparatus employed in the method of the present invention, care is taken to insure that the axis around which the drum 22 revolves is truly vertical and parallel to the vertical plane through the finish wire so that the film will be squared with respect to the finish line. Under these conditions the field of exposure of the film is disposed at right angles to the edge thereof and the finish line which, although not visible on the film, is at right angles to the edge thereof. With the camera thus properly squared on the finish line, neither inside runners nor outside runners are favored and, therefore, an accurate placing of the contestants can be determined by drawing or printing in a line 35 which is disposed at right angles to the edge of the film.

Throughout the foregoing discussion of the embodiment of the invention wherein the objects to be photographed are moving over a horizontal plane or track, the various axes of rotation have been defined as disposed in vertical planes. The invention is not limited to recording of objects moving in a horizontal plane and by suitable orientation may be used to record objects falling in a vertical plane or traveling in an oblique plane. Also, throughout the foregoing discussion, the photographically sensitive device has been specified as a film but it will be apparent to one skilled in the art that a photographic plate or other suitable material may be substituted without departing from the scope of the invention.

Thus it will be seen that the present invention provides a simple accurate record of the finish of the race which record is free from possibility of error since the images recorded on it are made as the contestants actually cross the finish line. The record permits accurate determination of the time not only of the first place winner as heretofore, but also of each succeeding contestant. The apparatus employed is comparatively simple and inexpensive and has been found capable of operating over a long period of time without difficulty.

In the examples shown and described herein, the invention has been applied to a race. Obviously, it is not limited to such use but rather can be put to many other uses. So long as the speed of travel of the moving object is slow enough to permit its being photographed by present day equipment, the method of the present invention may be used to record the movement of the objects past a given point or through a given plane.

While I have chosen to illustrate my invention by showing and describing a preferred embodiment of it, I have done so by way of example only, as there are many modifications and adaptations which can be made by one skilled in the art within the teachings of the invention.

Having thus complied with the statutes and shown and described a preferred embodiment of my invention, what I consider new and desire to have protected by Letters Patent is pointed out in the appended claims.

What is claimed is:

1. The combination with a camera in which a film is moved at a uniform rate of speed past a narrow aperture to record on the film images of objects moving across the narrow band-like field of the camera at right angles to the longer dimension of said field, of a timing device comprising, a stationary frame having an opening disposed in the field of the camera with one edge of the opening coinciding with one edge of the field, a timing means on said frame and visible to said camera only through said opening, means for moving said timing means uniformly in the same direction as and at approximately the same speed as said objects move across said field, and indicia on said timing means rendered visible through said opening at regular intervals by the uniform movement of the timing means.

2. Apparatus for recording a number of moving objects in the order in which they cross a particular line comprising, a drum mounted for rotation around a vertical axis, indicia on said drum, mask means forming a narrow slot one edge of which is in a perpendicular plane through said line, said drum being visible only through said slot, means for rotating said drum so that the portion thereof visible through said slot moves in the same direction and at approximately the same speed as said objects move in crossing said line, a camera, means for limiting the field of vision of said camera to a narrow band bounded on one of its longer sides by said line and including said slot, light sensitive means in said camera, and means for moving said light sensitive means at a uniform rate proportional to the peripheral speed of said drum and in the same direction as the movement of the images of the drum and objects to record on said means images of the indicia on said drum and of said objects moving across said line.

3. Means for recording and timing the moving of objects over a line which comprises, a backboard disposed at one end of said line and having a slit-like slot disposed with one edge in a perpendicular plane through said line, a drum mounted behind said backboard and visible through said slot, timing indicia on said drum, means for rotating said drum to register said timing indicia with said slot at regular intervals, a camera, stop means for said camera limiting the field of exposure thereof to a narrow strip one of the longer edges of which lies along said line, said field including a portion of said backboard and the slot therein, a film in said camera, and means for moving said film at a speed proportional to the speed of said drum and in the same direction as the movement of the images of the drum and objects to record on the film images of said timing indicia and the objects crossing said line.

4. An apparatus for recording and measuring the time elapsing between the passing of a first and a succeeding moving object past a given line, comprising a drum, means for rotating said drum at a uniform rate of speed, masking means for said drum including a rectangular slot disposed with one edge in a perpendicular plane through said line, marking indicia on said drum visible through said slot at timed intervals, a camera having movable film, a lens system in said camera for projecting moving images on said film, means for moving said film at a uniform rate of speed and in the same directions as the images move, and stop means for limiting the field of exposure of said camera to a narrow band one side of which falls on said line which band includes said slot to record on the film the objects passing said line and said indicia passing said slot.

5. The method of recording the movement of objects past a given line and timing the objects with respect to the leading one of the objects which comprises, moving a photographic film at a constant speed, limiting the exposure of said film to a narrow field and aligning that field to include said given line as one boundary of the field, placing a timing mark on a rotatable member, locating said member adjacent said line on the side of the objects away from said film, masking said member to render it visible only through a narrow band one margin of which coincides with said line and the other margin of which is parallel thereto and spaced therefrom a distance equal to the width of said field of exposure, moving said member and the timing mark carried thereby across said band in the same direction as and at a speed approximating the speed of said objects, and continuously projecting on said film only through said narrow field images of said objects and timing mark which images move in the same direction and at the same speed as the film to stop relative movement between the film and images thereby to expose the film and simultaneously record thereon images of the objects and images of the timing mark.

6. The method of recording and timing the passing of objects that move over a line in sequence which comprises, placing a timing mark on a rotatable member, locating said member at one end of said line, masking said member to render it visible only through a narrow band bounded on one side by said line, rotating said member to register said mark with said line at regular intervals and to move the mark across said band in the same direction and at the same speed as the objects move over the line, locating a movable film at the opposite end of said line, masking the film to render it exposable only through a narrow field, aligning said field with said line and the boundaries of said band, moving said film at a uniform rate of speed, and constantly projecting moving images of said objects as they cross said field and moving images of said timing mark as same crosses said band onto said film to expose said film and record said images thereon and thereby provide indications of the intervals of time elapsing between the crossings of said line by successive ones of said objects.

ROBERT E. CROWLEY.